(12) United States Patent
Wright

(10) Patent No.: US 7,927,411 B2
(45) Date of Patent: Apr. 19, 2011

(54) COMPOUND, INK, PROCESS AND USE

(75) Inventor: Gavin Wright, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 0 days.

(21) Appl. No.: 12/669,258

(22) PCT Filed: Jul. 15, 2008

(86) PCT No.: PCT/GB2008/002390
§ 371 (c)(1),
(2), (4) Date: Jan. 15, 2010

(87) PCT Pub. No.: WO2009/013459
PCT Pub. Date: Jan. 29, 2009

(65) Prior Publication Data
US 2010/0196675 A1    Aug. 5, 2010

(30) Foreign Application Priority Data
Jul. 25, 2007 (GB) .................................. 0714473.6

(51) Int. Cl.
*C09D 11/02* (2006.01)
*C09B 33/02* (2006.01)
*B41J 2/01* (2006.01)
*B32B 3/10* (2006.01)

(52) U.S. Cl. ............... 106/31.48; 534/797; 347/100; 428/195.1

(58) Field of Classification Search .......... 106/31.48; 534/797, 803; 347/100; 429/195.1
See application file for complete search history.

(56) References Cited

U.S. PATENT DOCUMENTS

| | | | | |
|---|---|---|---|---|
| 3,945,990 A * | 3/1976 | Ikeda et al. | ................... | 534/797 |
| 4,997,919 A | 3/1991 | Schaulin | ...................... | 534/637 |
| 5,006,128 A * | 4/1991 | Pedrazzi | ....................... | 534/797 |
| 5,268,459 A | 12/1993 | Gregory et al. | ................ | 534/637 |
| 5,374,301 A | 12/1994 | Gregory et al. | ............. | 106/22 K |
| 5,948,154 A * | 9/1999 | Hayashi et al. | ............. | 106/31.48 |
| 6,290,763 B1 * | 9/2001 | Millard et al. | ............. | 106/31.48 |
| 6,605,144 B1 * | 8/2003 | Watkinson et al. | ......... | 106/31.48 |
| 7,150,783 B2 | 12/2006 | Oshaughnessy et al. | ... | 106/31.48 |
| 7,163,576 B2 | 1/2007 | Oshaughnessy et al. | .. | 106/31.48 |

FOREIGN PATENT DOCUMENTS

| | | |
|---|---|---|
| EP | 0 357 560 | 3/1990 |
| EP | 0 468 647 | 1/1992 |
| GB | 1 415 558 | 11/1975 |
| GB | 1 525 280 | 9/1978 |
| GB | 2 007 250 | 5/1979 |
| GB | 2 036 780 | 7/1980 |
| GB | 2 222 174 | 2/1990 |
| JP | 48050083 | 7/1973 |
| WO | WO 2004/007618 | 1/2004 |

* cited by examiner

*Primary Examiner* — Helene Klemanski
(74) *Attorney, Agent, or Firm* — Morgan, Lewis & Bodkius LLP

(57) ABSTRACT

A process for printing an image on a substrate comprising applying to the substrate an ink comprising a medium and compound of Formula (1) or a salt thereof wherein the compound of Formula (1) or a salt thereof is a triazine coupled azo containing colorant. The process and colorant are especially useful for ink jet printing.

11 Claims, No Drawings

COMPOUND, INK, PROCESS AND USE

This is a 371 filing based on PCT/GB2008/002390 filed Jul. 15, 2008 and claiming priority from Great Britain Application No. 0714473.6, filed Jul. 25, 2007.

This invention relates to compounds which are useful as colorants, to inks (especially ink jet printing inks) containing said compounds, to a process for printing said ink on a substrate and to the use of said compounds for preparing inks. Ink jet printing (hereinafter IJP) is a non-impact printing technique in which droplets of ink are ejected through a fine nozzle onto a substrate without bringing the nozzle into contact with the substrate.

There are many demanding performance requirements for colorants and inks used in IJP. For example, they desirably provide sharp, non-feathered images having good water-fastness, light-fastness, ozone-fastness and optical density. The inks are often required to dry quickly when applied to a substrate to prevent smudging, but they should not form a crust over the tip of an ink jet nozzle because this will tend to reduce print quality and in extreme cases may prevent the printer from printing. The inks should also be stable to storage over time without decomposing or forming a precipitate which could block the fine nozzle.

Great Britain patent publication GB 2,036,780 A discloses disazo dyestuffs for dyeing cellulose containing materials.

PCT patent publication WO 2004/007618 A1 discloses disazo dyes containing an amino alkyl sulfonic acid attached to a triazine ring.

European patent publication EP 0468647 A1 discloses anionic azo compounds useful as colorants for ink jet printing inks.

We have found that certain compounds are suitable for use in an IJP ink and have one or more of the following desirable properties including good solubility, colour characteristics, light-fastness and particularly good chroma. Prints from inks containing these compounds may also have good optical density.

According to a first aspect of the present invention there is provided a process for printing an image on a substrate comprising applying to the substrate an ink comprising a medium and compound of Formula (1) or a salt thereof:

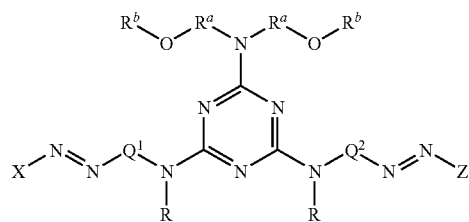

Formula (1)

wherein:
X is a naphthyl group substituted with at least one group selected from sulfonic acid and carboxylic acid groups;
$Q^1$ and $Q^2$ are each independently an optionally substituted arylene or polycyclic heteroarylene group each comprising a phenylene ring which is para connected to the —N=N— and the —NR— groups shown in Formula (1);
each R independently is H, optionally substituted alkyl or optionally substituted aryl;
Z is a phenyl group substituted with at least one group selected from sulfonic acid and carboxylic acid groups;
each $R^a$ independently is a $C_{2-4}$ linear alkylene group; and
each $R^b$ independently is H or methyl;

provided that collectively the groups X and Z must have at least one sulfonic acid group and at least one carboxylic acid group.

X may be attached to the —N=N— group in the compound of Formula (1) or salt thereof in the 1-naphthyl position, but is more preferably attached in the 2-naphthyl position.

In addition to being substituted with at least one group selected from sulfonic acid and carboxylic acid groups X may optionally be substituted with one or more groups other than sulfonic acid and carboxylic acid groups.

Preferred optional substituents include optionally substituted alkyl, alkoxy, amine, amide, ester, ketone and thioether groups, halo, acid (other than carboxylic acid and sulfonic acid), hydroxy, nitro, cyano and —$CF_3$ groups.

Preferably, the optionally substituted alkyl group is a $C_{1-8}$ alkyl group, more preferably an optionally substituted $C_{1-4}$ alkyl group.

Preferably, the optionally substituted alkoxy group is a $C_{1-8}$-alkoxy group, more preferably an optionally substituted $C_{1-4}$-alkoxy group.

Preferably, the optionally substituted amine group is of the formula —$NR^1R^2$ wherein $R^1$ and $R^2$ are each independently H or optionally substituted alkyl, aryl or heteroaryl, or $R^1$ and $R^2$ together with the nitrogen atom to which they are attached form an optionally substituted 5- or 6-membered ring (e.g. a piperidine, pyrrolidone, pyridine, piperizine or morpholine ring).

Preferably, the optionally substituted amide group is of the formula —$NHC(O)NR^1R^2$, —$C(O)NR^1R^2$, —$S(O)_2NR^1R^2$ or —$NHC(O)R^3$, wherein $R^3$ is H or optionally substituted alkyl, aryl or heteroaryl and $R^1$ and $R^2$ are as hereinbefore defined.

Preferred optionally substituted ester groups are of the formula —$C(O)OR^4$ or —$S(O)_2OR^4$, wherein $R^4$ is optionally substituted alkyl, aryl or heteroaryl.

Preferred optionally substituted ketone groups are of the formula —$C(O)R^4$ wherein $R^4$ is as hereinbefore defined.

Preferred optionally substituted thioether groups are of the formula —$SR^4$, wherein $R^4$ is as hereinbefore defined.

Optionally substituted alkyl, alkoxy, amine, amide, ester, ketone or thioether substituents may have one or more halo, amino, $C_{1-4}$-alkoxy, hydroxy, sulfonic acid, carboxylic acid and phosphonic acid groups.

Preferred halo groups are Cl, F, Br and I.

The preferred optional acid group is a phosphonic acid group.

Preferably, X is substituted with at least one sulfonic acid group.

Preferably, X is substituted with from 1 to 3, more preferably 2 or 3 and especially 2 sulfonic acid groups.

In one embodiment X is substituted with a number of sulfonic acid groups other than 2, especially 1 or 3.

Preferably, X has no substituents other than sulfonic acid groups.

Preferably. X is of Formula (2) or (3):

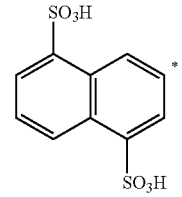

Formula (2)

Formula (3)

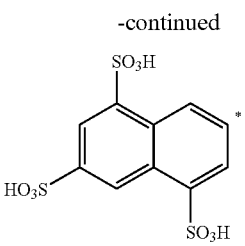

wherein the asterisk (*) represents the point of attachment to the —N═N— group.

Preferably both $Q^1$ and $Q^2$ are arylene groups, more preferably $Q^1$ and $Q^2$ are the same arylene group.

The arylene group may be either polycyclic (e.g. naphthylene) or more preferably monocyclic (eg. phenylene).

Preferably, $Q^1$ and $Q^2$ are each independently optionally substituted naphthylene or phenylene, more preferably both $Q^1$ and $Q^2$ are optionally substituted phenylene, in each case comprising a phenylene ring which is para connected to both the —N═N— and the —NR— groups shown in Formula (1).

Preferably, the optionally substituted polycyclic heteroarylene groups comprise a phenylene ring condensed with a 5- or 6-membered ring comprising one or more nitrogen, sulphur, oxygen or phosphorus atoms in the 5- or 6-membered ring (e.g. an indole group comprising a phenylene ring which is para connected to both the —N═N— and the —NR— groups in Formula (1)).

$Q^1$ and $Q^2$ may be substituted with one or more substituents.

The optional substituents which may be present on $Q^1$ and $Q^2$ are preferably any of the substituents which may be attached to X.

The optional substituents which may be present on $Q^1$ and $Q^2$ are preferably selected from $C_{1-4}$-alkoxy (especially methoxy and ethoxy), $C_{1-4}$-alkyl (especially methyl), —NHCONH$_2$, —NHSO$_2$—$C_{1-4}$-alkyl (especially —NHSO$_2$CH$_3$), carboxylic acid, sulfonic acid and phosphonic acid.

Preferably, either $Q^1$ or $Q^2$ is unsubstituted, more preferably both $Q^1$ and $Q^2$ are unsubstituted.

$Q^1$ and $Q^2$ may be the some or different.

Preferably, both $Q^1$ and $Q^2$ are of Formula (4):

Formula (4)

wherein the asterisks (*) represent the points of attachment to the —N═N— and —NR— groups.

Preferred optionally substituted alkyl and optionally substituted aryl groups are as mentioned above for X.

Preferably, each R independently is H or optionally substituted alkyl. More preferably each R independently is H or $C_{1-4}$-alkyl, especially H.

In addition to being substituted with at least one group selected from sulfonic acid and carboxylic acid groups Z may optionally be substituted with one or more groups other than sulfonic acid and carboxylic acid groups. The optional substituent may be any of those hereinbefore described as optional substituents for X.

Preferably Z, is substituted with at least one carboxylic acid group.

Preferably, Z has no substituents other than carboxylic acid groups.

Preferably, Z is substituted with from 1 to 3 carboxylic acid groups, more preferably 2 or 3 and especially 2 carboxylic acid groups.

In one embodiment Z is substituted with a number of carboxylic acid groups other than 2, especially 1 or 3.

Compounds of Formula (1) and salts thereof wherein Z is substituted with two carboxylic acid groups demonstrate even better light-fastness, solubility, chroma and provide prints having higher optical density.

Preferably. Z is substituted with at least one carboxylic acid group and X is substituted with at least one sulfonic acid group.

In one embodiment the number of sulfonic acid substituents on X and Z differ, for example X is substituted with two sulfonic acid group and Z is substituted with no sulfonic acid groups. In another embodiment the number of carboxylic acid groups on X and Z differ, for example X has no carboxylic acid groups and Z has two carboxylic acid groups. More preferably, X has a different number of both carboxylic acid and sulfonic acid substituents than Z, for example X has no carboxylic acid and 2 sulfonic acid substituents and Z has two carboxylic acid and no sulfonic acid substituents.

In a preferred compound of Formula (1) or salt thereof:
a) X is substituted with one or more sulfonic acid groups but not with any carboxylic acid groups and Z is substituted with one or more carboxylic acid groups but not with any sulfonic acid groups; or
b) X is substituted with one or more carboxylic acid groups but not with any sulfonic acid groups and Z is substituted with one or more sulfonic acid groups but not with any carboxylic acid groups.

Of the two groups of compounds a) and b) group a) is preferred.

Preferably, Z is of Formula (5):

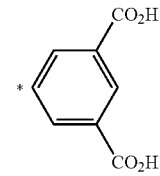

Formula (5)

wherein the asterisk (*) represents the point of attachment to the —N═N— group in the compound of Formula (1).

The groups represented by $R^a$ may be different but are preferably the same.

$R^a$ is preferably CH$_2$CH$_2$CH$_2$ or CH$_2$CH$_2$, more preferably CH$_2$CH$_2$.

The groups represented by $R^b$ may be different but are preferably the same.

$R^b$ is preferably H.

Preferably, both the groups represented by the formula $R^b$—O—$R^a$ are of formula HOCH$_2$CH$_2$.

According to a second aspect of the present invention there is provided a compound of Formula (1a) or a salt thereof:

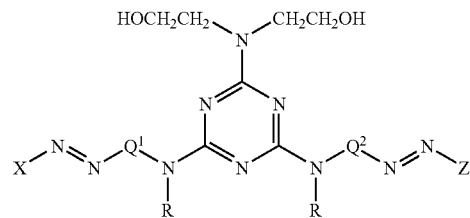

Formula (1a)

wherein:
X is a naphthyl group attached to the —N═N— group in the 2-naphthyl position and substituted with at least one sulfonic acid group;
$Q^1$ and $Q^2$ are each independently an optionally substituted phenylene group;
each R independently is H, optionally substituted alkyl or optionally substituted aryl;

Z is a phenyl group substituted with at least two carboxylic acid groups.
Preferably, Z is substituted with two carboxylic acid groups, more preferably Z is substituted with two carboxylic acid groups and no other substituents.
Preferably, Z is of Formula (5):

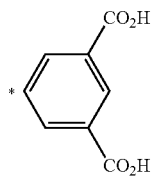

Formula (5)

wherein the asterisk (*) represents the point of attachment to the —N=N— group in the compound of Formula (1) or salt thereof.

Preferably, Z is substituted with two carboxylic acid groups and both of the groups represented by R are H, In addition to this, it is preferred that the naphthyl group represented by X is of Formula (2) or (3) as hereinbefore defined. More preferably X is substituted with two sulfonic acid groups.

In one embodiment the compound of Formula (1) or salt thereof is or is not of Formula (6a):

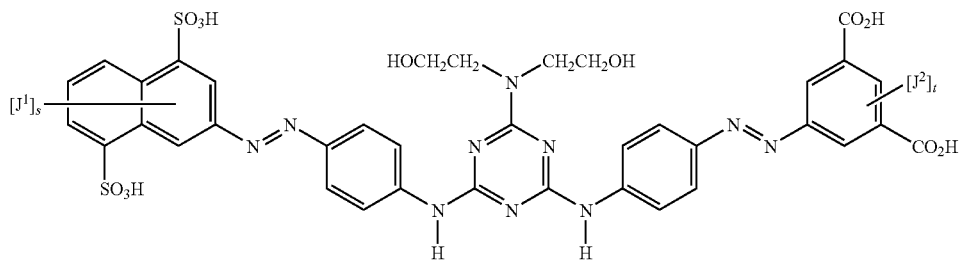

Formula (6a)

wherein:
$J^1$ and $J^2$ are each independently a substituent;
s is from 0 to 5; and
t is from 0 to 3.
$J^1$ and $J^2$ may each independently be any of the substituents hereinbefore mentioned which may be attached to X.

Preferred compounds of Formula (1) or a salt thereof are of Formulae (6) to (8) or salts thereof:

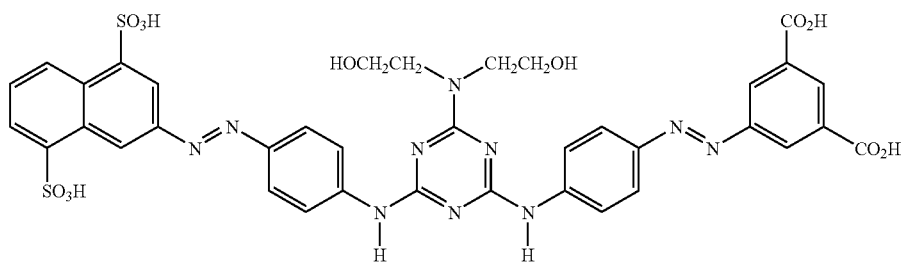

Formula (6)

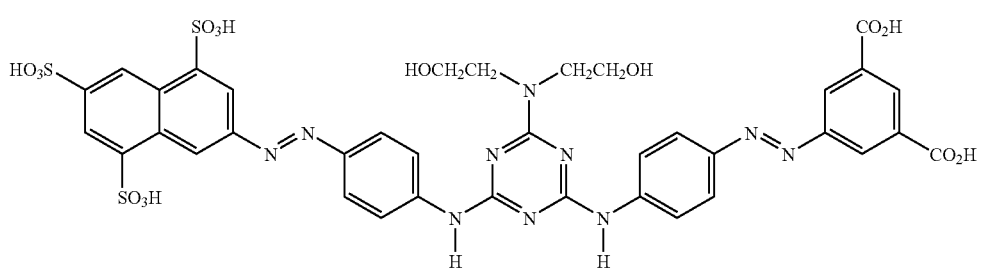

Formula (7)

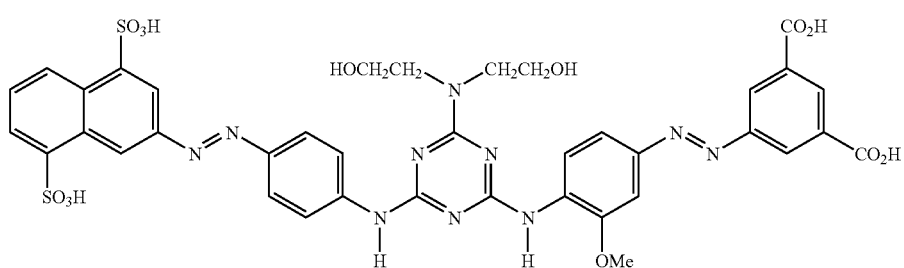

Formula (8)

The compounds of Formula (1) and salts thereof exist in tautomeric forms other than those shown in this specification and such tautomers are included within the scope and claims of the present invention.

The compound of Formula (1) may be in the protonated (free acid) or salt form or a mixture thereof. Preferably, the compound of Formula (1) is in the form of a salt.

Preferred salt forms are water-soluble, for example alkali metal salts (especially lithium, sodium, potassium), ammonium, substituted ammonium and mixed salts thereof.

Preferred ammonium and substituted ammonium salts are ammonium and alkyl or aryl substituted ammonium (e.g. ammonium, alkanolammonium, pyridinium, piperidinium and morpholinium).

It is especially preferred that the compounds of Formula (1) are in the form of a sodium, lithium, potassium or ammonium salt or a mixture thereof.

Preferably, the compound of Formula (1) or a salt thereof has from 2 to 10, more preferably from 2 to 6 and especially from 3 to 5 groups selected from sulfonic acid, phosphonic acid and carboxylic acid groups.

Preferably, the compound of Formula (1) or a salt thereof is a dye, more preferably a dye which is soluble in the medium, especially preferably a water-soluble dye.

Preferably, the compound of Formula (1) is yellow, orange or brown in colour. Preferably, inks containing about 5% by weight of the compound of Formula (1) or a salt thereof are yellow in colour.

The compounds and salts thereof as defined in the first aspect of the present invention are useful for preparing inks (especially IJP inks). These inks, when printed, exhibit particularly good ozone-fastness, optical density, colour space and especially good light-fastness.

The compounds of Formula (1) or a salt thereof are preferably free from fibre reactive groups because such groups tend to reduce the long-term storage stability of inks. The term "fibre reactive group" is well understood in the art and is used for example in EP 0356014 A1. Fibre reactive groups are capable, under suitable conditions, of reacting with the hydroxy groups present in cellulosic fibres or with the amino groups present in natural fibres to form a covalent linkage between the fibre and the compound. Examples of fibre reactive groups which are preferably not present in the compounds of Formula (1) or salts thereof include: halo -1,3,5-triazinyl, halo-pyrimidyl, beta-halo-propionyl, beta-halo ethyl-sulphonyl, beta-sulfonic acid ethyl-sulfonyl, beta-halo ethylsulfamyl, chloroacetyl amino, beta-sulfonic acid ethyl sulphamyl and vinyl sulphonyl groups.

The compounds of Formula (1) and salts thereof may be prepared by the reaction of a compound of Formula (9) or a salt thereof with a compound of Formula $R^b$—O—$R^a$—NH—$R^a$—O—$R^b$, which is preferably diethanolamine:

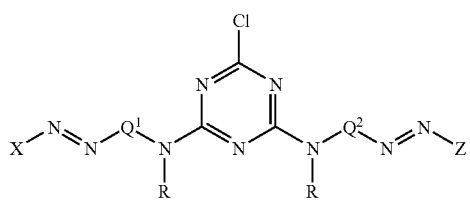

Formula (9)

wherein X, $Q^1$, $Q^2$, R, $R^a$, $R^b$ and Z are as hereinbefore defined.

The reaction with the compound of Formula $R^b$—O—$R^a$—NH—$R^a$—O—$R^b$ is preferably performed at a temperature of from 60 to 70° C. for a period of 2 to 8 hours in an aqueous liquid medium.

The compound of Formula (9) or a salt thereof is preferably prepared by reacting about 1 mole of a compound of Formula (10) or a salt thereof with about 1 mole of a compound of Formula (11) or a salt thereof:

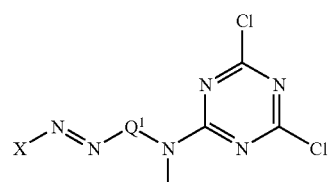

Formula (10)

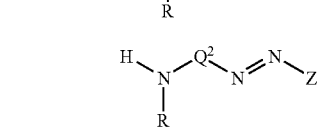

Formula (11)

wherein X, $Q^1$, $Q^2$, R and Z are as hereinbefore defined.

The reaction to prepare the compound of Formula (9) or a salt thereof is preferably performed at a temperature of from 20 to 40° C. and a pH of from 7 to 8 in an aqueous liquid medium for a period of from 2 to 24 hours.

The compound of Formula (10) or a salt thereof is preferably prepared by reacting a compound of Formula (12) or a salt thereof with cyanuric chloride:

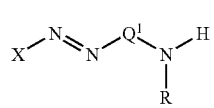

Formula (12)

wherein X, $Q^1$ and R are as hereinbefore defined.

The reaction with cyanuric chloride is preferably preformed at a pH of from 5 to 7 and a temperature of from 0 to 20° C. over a period of from 10 minutes to 3 hours.

The compound of Formula (11) or a salt thereof is preferably prepared by diazotising a compound of Formula Z—$NH_2$ to give a diazonium salt and coupling the resultant diazonium compound Formula $Q^2$-NRH, wherein Z, $Q^2$ and R are as hereinbefore defined.

Similarly the compound of Formula (12) or a salt thereof is preferably prepared by diazotising a compound of Formula X—$NH_2$ to give a diazonium salt and coupling the resultant diazonium salt with a compound of Formula $Q^1$NRH wherein X, $Q^1$ and R are as hereinbefore defined.

The diazotisation is preferably performed at a temperature below 20° C., more preferably at a temperature from 0° C. to 5° C. Preferably, the diazotisation is performed in a liquid comprising water, preferably having a very acidic pH (below 3). Mineral acids (e.g. HCl or $H_2SO_4$ or mixtures thereof) are typically used to achieve such an acidic pH.

The coupling reaction is preferably performed at a temperature of from 0 to 5° C., typically for a period of 1 to 6 hrs. It is often desirable to add a buffer (e.g. sodium acetate) to adjust the pH to 4 to 5. The coupling reaction is preferably performed in a liquid comprising water. The coupling reaction is preferably continued for a further period of 16 hours at a temperature of 25° C.

The medium may be a low melting point solid medium, but is preferably a liquid medium. Preferably, the medium is liquid at a temperature of 25° C.

Preferred liquid media include water, a mixture of water and an organic solvent and an organic solvent free from water.

When the liquid medium comprises a mixture of water and an organic solvent, the weight ratio of water to organic solvent is preferably from 99:1 to 1:99, more preferably from 99:1 to 50:50 and especially from 95:5 to 70:30.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-miscible organic solvents.

Especially preferred water-miscible organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and di-$C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

A preferred liquid medium comprises:
(a) from 75 to 95 parts water; and
(b) from 25 to 5 parts in total of one or more organic solvents selected from diethylene glycol, 2-pyrrolidone, thiodiglycol, N-methylpyrrolidone, cyclohexanol, caprolactone, caprolactam and pentane-1,5-diol;
wherein the parts are by weight and the sum of the parts (a) and (b)=100.

Examples of further suitable ink media comprising a mixture of water and one or more organic solvents are described in U.S. Pat. No. 4,963,189, U.S. Pat. No. 4,703,113, U.S. Pat. No. 4,626,284 and EP 4,251,50A.

When the liquid medium comprises an organic solvent free from water, (i.e. less than 1% water by weight) the organic solvent preferably has a boiling point of from 30° to 200° C., more preferably of from 30° to 150° C., especially from 30 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the compound of Formula (1) or a salt thereof in the liquid medium. Examples of polar solvents include $C_{1-4}$-alcohols and ketones.

In view of the foregoing preferences it is especially preferred that where the liquid medium is an organic solvent free from water it comprises a ketone (especially methyl ethyl ketone) and/or an alcohol (especially a $C_{1-4}$-alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Ink media comprising an organic solvent free from water are particularly useful where fast drying times are required and particularly when printing onto hydrophobic and non-absorbent substrates, for example plastics, metal and glass.

Preferably, the low melting point solid is solid at 25° C. and melts at a temperature above 50° C. More preferably, the low melting point solid has a melting point in the range from 60° C. to 125° C.

Suitable media which melt in this temperature range include long chain fatty acids, sulfonamides or alcohols, preferably those having $C_{18-24}$ chains. The compound of Formula (1) or salt thereof may be dissolved in the low melting point solid or may be finely dispersed in it.

The ink may also contain additional components suitable for use in ink jet printing inks, for example viscosity and surface tension modifiers, corrosion inhibitors, biocides, kogation reducing additives and surfactants.

Preferably, the process according to the first aspect of the present invention applies the ink to the substrate by means of an ink jet printer. Preferred ink jet printers include thermal and piezo ink jet printers.

The image printed on the substrate may take the form of text, drawings, bar codes or photographs and the like.

According to a third aspect of the present invention there is provided an ink comprising a compound of Formula (1) or a salt thereof according to the second aspect of the present invention and a medium. The medium is as hereinbefore described.

The medium may be a liquid medium or a low melting point solid medium.

Preferably, the ink according to the third aspect of the present invention comprises:
  a) from 0.01 to 30 parts of one or more compounds of the Formula (1) or a salt thereof; and
  b) from 70 to 99.99 parts of a liquid medium or a low melting point solid medium;
wherein all parts are by weight and the number of parts of (a)+(b)=100.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

Preferably, component (a) is completely dissolved in component (b). Preferably, component (a) has a solubility in component (b) at 20° C. of at least 5%, more preferably at least 10% by weight. This allows the preparation of concentrates which may be used to prepare more dilute inks and reduces the chance of the compound of Formula (1) or salt thereof precipitating if evaporation of the liquid medium occurs during storage.

The viscosity of the ink is preferably less than 50 mPa·s, more preferably less that 20 mPa·s and especially less than 5 mPa·s. The viscosity is preferably measured at a temperature of 25° C. Preferably, the viscosity is measured by means of a cone and plate rheometer at a shear rate corresponding to 100 rpm. Preferably, the ink is Newtonian in its viscosity behaviour (i.e. the viscosity is insensitive to shear rate).

Preferably, the ink has been filtered through a filter having an average pore size of less than 10 microns. More preferably the ink has been filtered through a filter having an average pore size of from 10 to 0.2, more preferably from 5 to 1 micron. In this way the ink is substantially free from particulate matter having a particle size above 1 micron.

Preferably, the ink has a concentration of halide ions of less than 500 parts per million and more preferably less than 100 parts per million. It is especially preferred that the ink has less than 100, more preferably less than 50 parts per million in total of divalent and trivalent metals. Parts per million refer to parts by weight of the relevant ions or metals relative to the total weight of the ink. Any suitable means to remove halide ions and/or di and trivalent metals may be employed, e.g. ion exchange and ultra-filtration.

According to a fourth aspect of the present invention there is provided a substrate (preferably paper, an overhead projector slide or a textile material) printed with an ink according to the third aspect of the present invention.

Preferred papers are plain or treated papers which may have an acid, alkaline or neutral character. Examples of commercially available treated papers include: Examples of commercially available plain and treated papers include: Photo Paper Pro (PR101), Photo Paper Plus (PP101), Glossy Photo Paper (GP401), Semi Gloss Paper (SG101), Matte Photo Paper (MP101), (all available from Canon); Premium Glossy Photo Paper, Premium Semi gloss Photo Paper, ColorLife™, Photo Paper, Photo Quality Glossy Paper, Double-sided Matte Paper, Matte Paper Heavyweight, Photo Quality Inkjet Paper, Bright White Inkjet Paper, Premium Plain Paper, (all available from Seiko Epson Corp); HP All-In-One Printing Paper, HP Everyday Inkjet Paper, HP Everyday Photo Paper Semi-glossy, HP Office Paper, HP Photo Paper, HP Premium High-Gloss Film, HP Premium Paper, HP Premium Photo Paper, HP Premium Plus Photo Paper, HP Printing Paper, HP Superior Inkjet Paper, (all available from Hewlett Packard Inc.); Everyday Glossy Photo Paper, Premium Glossy Photo Paper, (both available from Lexmark™ Inc.); Matte Paper, Ultima Picture Paper, Premium Picture Paper, Picture Paper, Everyday Picture Paper (available from Kodak Inc.).

Preferred substrates are those having a receptor layer for the ink. The receptor layer may be porous or non-porous.

According to a fifth aspect of the present invention there is provided an ink jet printer cartridge comprising a chamber and ink, wherein the ink is present in the chamber and the ink is according to the third aspect of the present invention.

According to a sixth aspect of the present invention there is provided the use of a compound of Formula (1) or a salt thereof as defined in the first aspect of the present invention or according to the second aspect of the present invention for preparing an ink (especially an ink jet printing ink) comprising said compound or salt thereof and a liquid medium wherein the liquid medium comprises water and a water-miscible organic compound.

In one embodiment it is preferred that the ink has been purified to remove impurities by one or more of the methods including dialysis, ultrafiltration and ion-exchange.

It is preferred that the ink comprises water and that the water has been previously purified to a conductivity of less than 2, more preferably less than 1 and especially less than 0.5 µS/cm. The water may be purified by, for example, reverse osmosis, ion-exchange or distillation.

The present invention is illustrated by the following examples wherein all parts are by weight unless otherwise stated.

EXAMPLES

Example 1

Preparation of Dye (1)

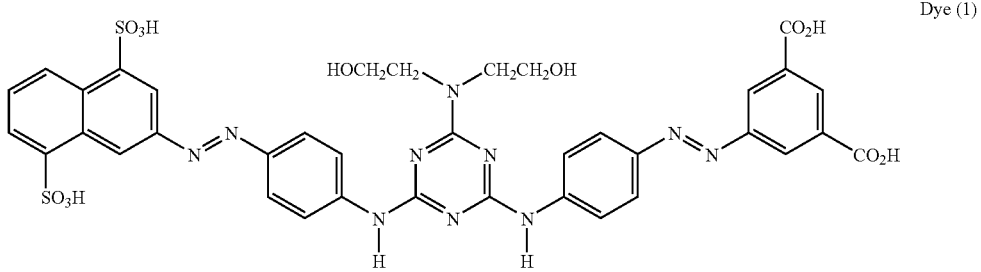

Dye (1)

Dye (1) was prepared according to the stages (a) to (e):

Stage (a): Preparation of Intermediate (1a)

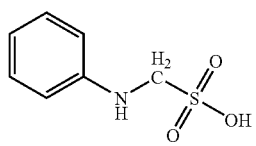

Intermediate (1a)

Aniline (511 g, 5.5 mol) was added slowly to a solution of formaldehyde/sodium bisulfite addition compound (740 g, 5.5 mol) in water (1000 ml) at a temperature of 40° C. to form a reaction mixture.

The reaction mixture was stirred for 3 hours at a temperature of 50° C., then sodium chloride (100 g) was added and the reaction mixture was stirred for a further 3 hours whilst allowing the reaction mixture to cool to a temperature of 25° C.

The product precipitated. The product was collected by filtration, washed with methylated spirit (3×300 ml) and dried to give 970 g of Intermediate (1a) in the form of a white solid.

Stage (b): Preparation of Intermediate (1b)

Intermediate (1b)

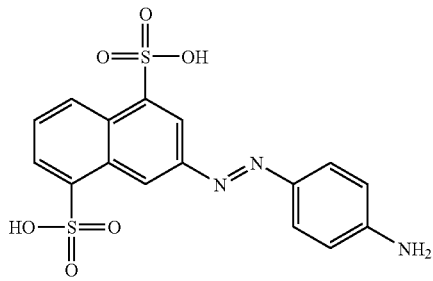

Stage (c): Preparation of Intermediate (1c)

Intermediate (1c)

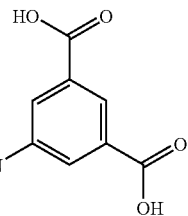

Intermediate (1c) was prepared in exactly the same way as Intermediate (1b) except that in stage (b) the 3-aminonaphthalene-1,5-disulfonic acid was replaced with 5-aminoisophthalic acid in the same molar amounts.

Stage (d): Preparation of Intermediate (1d)

Intermediate (1d)

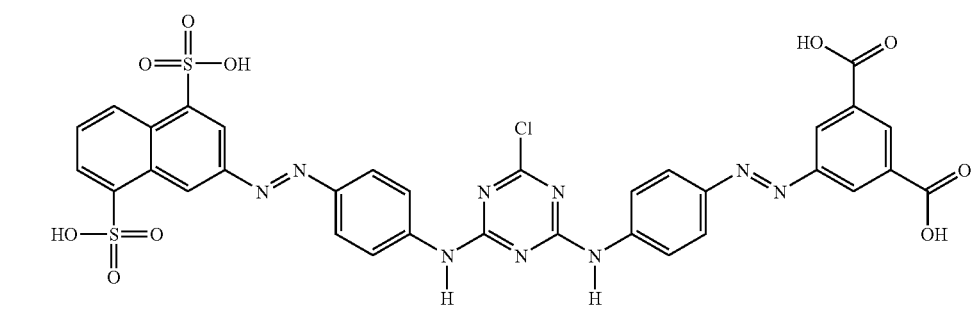

3-aminonaphthalene-1,5-disulfonic acid (60.6 g, 0.2 mol) was dissolved in water (800 ml) and this was adjusted to a pH of 7 by the addition of 2N sodium hydroxide solution, then sodium nitrite (13.8 g, 0.2 mol) was added to form a solution.

The above solution was added dropwise to a mixture of concentrated sulphuric acid (60 g) and water (150 ml) at a temperature of from 0 to 5° C. to form a reaction mixture.

The reaction mixture was stirred for a period of 2 hours at a temperature of from 0 to 5° C. Intermediate (1a) from stage (a) (37.4 g, 0.2 mol) was added in portions over a period of 1 hour to the reaction mixture at a temperature of from 0 to 5° C., the pH was adjusted to 4-5 by the addition of sodium acetate and the reaction mixture was stirred for a further period of 4 hours still at a temperature of from 0 to 5° C. Sodium hydroxide (100 g) was added to the reaction mixture which was then stirred at a temperature of 80° C. for a further 6 hours.

The reaction mixture was allowed to cool to 25° C. and the product was precipitated by the addition of sodium chloride (200 g). The product was collected by filtration and dried to give 35 g of Intermediate (1b) in the form of an orange solid.

A solution of cyanuric chloride (9.2 g, 0.05 mol) in acetone (100 ml) was added to a mixture of ice/water (300 g) to form a cyanuric chloride suspension.

Intermediate (1b) from stage (b) (20.4 g, 0.05 mol) was dissolved in water (200 ml), adjusted to pH 7 by the addition of 2N sodium carbonate solution and then added to the above described cyanuric chloride suspension at a temperature of from 0 to 5° C. to form a reaction mixture. The pH of the reaction mixture was maintained at 5-6.5 using sodium carbonate solution for a period of 1 hour. The reaction mixture was then allowed to warm to a temperature of 20° C.

Intermediate (1c) from stage (c) (14.3 g, 0.05 mol) was dissolved in water (200 ml), adjusted to a pH of 7 by the addition of 2N sodium carbonate solution and then added to the reaction mixture at a temperature of 20° C. The reaction mixture was stirred at a temperature of from 30 to 40° C. and at a pH of from 7 to 8 (using 2N sodium hydroxide solution) for a period of 18 hrs. The product Intermediate (1d) precipitated and was collected by filtration.

Stage (e): Preparation of Dye (1)

A solution containing Intermediate (1d) from stage (d) in water (1000 ml) and diethanolamine (15.6 g, 0.15 mol) was prepared and stirred at a temperature of from 60 to 70° C. for a period of 4 hours. The solution was then allowed to cool to a temperature of 25° C.

The product was precipitated by the addition of sodium chloride (250 g) and collected by filtration. The solid was dissolved in water (500 ml) and purified by dialysis in membrane tubing to low conductivity (<50 μs). Dye (1) was obtained by evaporating away the water to yield 38 g of Dye (1) in the form of an orange solid.

Dyes (1) may be used to prepare ink jet printing inks which demonstrate particularly good ozone and light fastness, chroma, solubility and provide prints having high optical densities. Dye (1) was in the form of the sodium salt.
Comparative Dye (1)=Comparative Example 1 of WO 2004/007618

Example 1 was repeated except that in stage (e) diethanolamine was replaced with the same molar amount of ethanolamine.

Solubility

The solubility of Dye (1) and Comparative Dye (1) in water were measured to be 30% and 15% of dye by weight respectively. It was surprisingly found that, Dye (1) had twice the solubility of Comparative Dye (1) in water.

Physical Form

Dye (1) exhibited liquid crystalline characteristics in aqueous solution having a dye concentration of above about 25% by weight of Dye whilst Comparative Dye (1) exhibited no liquid crystalline behaviour. This is anticipated to correspond to enhanced stability against precipitation and reduced dye degradation for concentrated solutions containing the compounds used in the present invention. The difference in liquid crystalline behaviour is surprising given the structural similarity of Dye (1) and Comparative Dye (1).

Comparative Dye (1)

[Chemical structure diagram]

The product was a yellow dye, Comparative Dye (1). This was in the form of the sodium salt.

Ink Examples

Inks may be prepared containing Dye (1) and Comparative Dye (1) by mixing the components in listed in Table 1.

TABLE 1

| Component | Ink (1) | Comparative Ink (1) |
| --- | --- | --- |
| 2-Pyrrolidone | 5 | 5 |
| Thiodiglycol | 5 | 5 |
| Surfynol ™ 465 | 1 | 1 |
| Dye (1) | 3 | — |
| Comparative Dye (1) | — | 3 |
| Water | 86 | 86 |

In Table 1 all parts are by weight.
Surfynol ™ is a registered trademark of Air Products.

Further Inks

The inks described in Tables I and II may be prepared wherein the Dye described in the first column is the Dye (1) as made in the above Example. Numbers quoted in the second column onwards refer to the number of parts of the relevant ingredient and all parts are by weight. The inks may be applied to paper by thermal or piezo ink jet printing.

The following abbreviations are used in Table I and II:
PG=propylene glycol
DEG=diethylene glycol
NMP=N-methylpyrrolidone
DMK=dimethylketone
IPA=isopropanol
MeOH=methanol
2P=2-pyrrolidone
MIBK=methylisobutyl ketone
P12=propane-1,2-diol
BDL=butane-2,3-diol
CET=cetyl ammonium bromide
PHO=$Na_2HPO_4$ and
TBT=tertiary butanol
TDG=thiodiglycol

TABLE I

| Dye | Dye Content | Water | PG | DEG | NMP | DMK | NaOH | Na Stearate | IPA | MEOH | 2P | MIBK |
| --- | --- | --- | --- | --- | --- | --- | --- | --- | --- | --- | --- | --- |
| 1 | 2.0 | 80 | 5 | | 6 | 4 | | | | | 5 | |
| 1 | 3.0 | 90 | | 5 | 5 | | 0.2 | | | | | |
| 1 | 10.0 | 85 | 3 | | 3 | 3 | | | | 5 | 1 | |
| 1 | 2.1 | 91 | | 8 | | | | | | | | 1 |
| 1 | 3.1 | 86 | 5 | | | | | 0.2 | 4 | | | 5 |
| 1 | 1.1 | 81 | | | 9 | | 0.5 | 0.5 | | 9 | | |
| 1 | 2.5 | 60 | 4 | 15 | 3 | 3 | | | 6 | 10 | 5 | 4 |
| 1 | 5 | 65 | | 20 | | | | | 10 | | | |
| 1 | 2.4 | 75 | 5 | 4 | | 5 | | | | 6 | | 5 |
| 1 | 4.1 | 80 | 3 | 5 | 2 | 10 | | 0.3 | | | | |
| 1 | 3.2 | 65 | | 5 | 4 | 6 | | | 5 | 4 | 6 | 5 |
| 1 | 5.1 | 96 | | | | | | | | 4 | | |

TABLE I-continued

| Dye | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 10.8 | 90 | 5 | | | | | | 5 | | | |
| 1 | 10.0 | 80 | 2 | 6 | 2 | 5 | | | 1 | | 4 | |
| 1 | 1.8 | 80 | | 5 | | | | | | | 15 | |
| 1 | 2.6 | 84 | | | 11 | | | | | | 5 | |
| 1 | 3.3 | 80 | 2 | | | 10 | | | | 2 | | 6 |
| 1 | 12.0 | 90 | | | 7 | | 0.3 | | 3 | | | |
| 1 | 5.4 | 69 | 2 | 20 | 2 | 1 | | | | | 3 | 3 |
| | 6.0 | 91 | | | 4 | | | | | | 5 | |

TABLE II

| Dye | Dye Content | Water | PG | DEG | NMP | CET | TBT | TDG | BDL | PHO | 2p | PI2 |
|---|---|---|---|---|---|---|---|---|---|---|---|---|
| 1 | 3.0 | 80 | 15 | | | 0.2 | | | | | 5 | |
| 1 | 9.0 | 90 | | 5 | | | | | | 1.2 | | 5 |
| 1 | 1.5 | 85 | 5 | 5 | | 0.15 | 5.0 | 0.2 | | | | |
| 1 | 2.5 | 90 | | 6 | 4 | | | | | 0.12 | | |
| 1 | 3.1 | 82 | 4 | 8 | | 0.3 | | | | | | 6 |
| 1 | 0.9 | 85 | | 10 | | | | | 5 | 0.2 | | |
| 1 | 8.0 | 90 | | 5 | 5 | | | 0.3 | | | | |
| 1 | 4.0 | 70 | | 10 | 4 | | | | 1 | | 4 | 11 |
| 1 | 2.2 | 75 | 4 | 10 | 3 | | | | 2 | | 6 | |
| 1 | 10.0 | 91 | | | 6 | | | | | | 3 | |
| 1 | 9.0 | 76 | | 9 | 7 | | 3.0 | | | 0.95 | 5 | |
| 1 | 5.0 | 78 | 5 | 11 | | | | | | | 6 | |
| 1 | 5.4 | 86 | | | 7 | | | | | | 7 | |
| 1 | 2.1 | 70 | 5 | 5 | 5 | 0.1 | 0.2 | 0.1 | 5 | 0.1 | 5 | |
| 1 | 2.0 | 90 | | 10 | | | | | | | | |
| 1 | 2 | 88 | | | | | | 10 | | | | |
| 1 | 5 | 78 | | | 5 | | | 12 | | | 5 | |
| 1 | 8 | 70 | 2 | | 8 | | | 15 | | | 5 | |
| 1 | 10 | 80 | | | | | | | 8 | | 12 | |
| 1 | 10 | 80 | | | 10 | | | | | | | |

The invention claimed is:

1. A process for printing an image on a substrate comprising applying to the substrate, by means of an ink jet printer, an ink comprising a medium and compound of Formula (1) or a salt thereof:

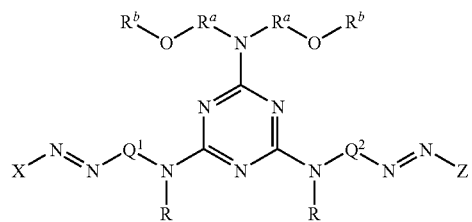

Formula (1)

wherein:
X is a naphthyl group substituted with at least one sulfonic acid group;
$Q^1$ and $Q^2$ are each independently an optionally substituted arylene or polycyclic heteroarylene group each comprising a phenylene ring which is para connected to the —N=N— and the —NR— groups shown in Formula (1);
each R independently is H, optionally substituted alkyl or optionally substituted aryl;

Z is of Formula (5):

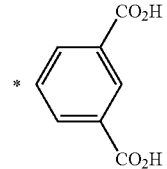

Formula (5)

wherein the asterisk (*) represents the point of attachment to the —N=N— group in the compound of Formula (1) or a salt thereof;
each $R^a$ independently is a $C_{2-4}$ linear alkylene group; and
each $R^b$ independently is H or methyl.

2. A process according to claim 1 wherein both the groups represented by $R^b$—O—$R^a$ are of the formula $HOCH_2CH_2$.

3. A process according to claim 1 wherein X is of Formula (2) or (3):

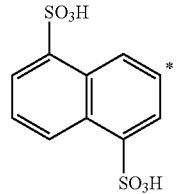

Formula (2)

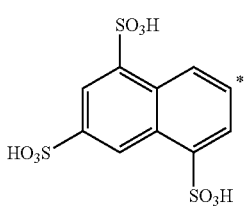

Formula (3)

wherein the asterisk (*) represents the point of attachment to the —N=N— group.

4. A process according to claim 1 wherein the compound of Formula (1) is in the form of a salt which is an alkali metal salt ammonium salt, substituted ammonium salt or a mixed salt thereof.

5. A compound of Formula (Ia) or a salt thereof:

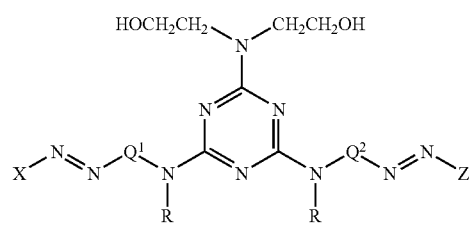

Formula (1a)

wherein:
- X is a naphthyl group attached to the —N=N— group in the 2-naphthyl position and substituted with at least one sulfonic acid group;
- $Q^1$ and $Q^2$ are each independently an optionally substituted phenylene group;
- each R independently is H, optionally substituted alkyl or optionally substituted aryl;
- Z is of Formula (5):

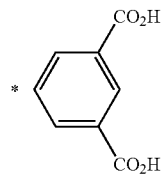

Formula (5)

wherein the asterisk (*) represents the point of attachment to the —N=N— group in the compound of Formula (1) or a salt thereof.

6. A compound or a salt thereof according to claim 5 wherein X is of the Formula (2) or (3):

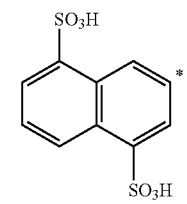

Formula (2)

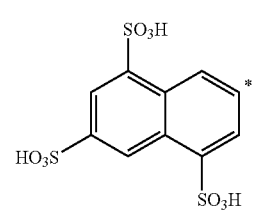

Formula (3)

wherein the asterisk (*) represents the point of attachment to the —N=N— group.

7. A compound or a salt thereof according to claim 5 which is of any one of Formulae (6) to (8) or a salt thereof:

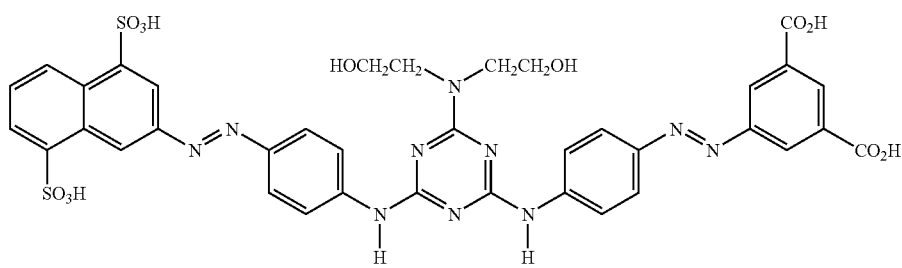

Formula (6)

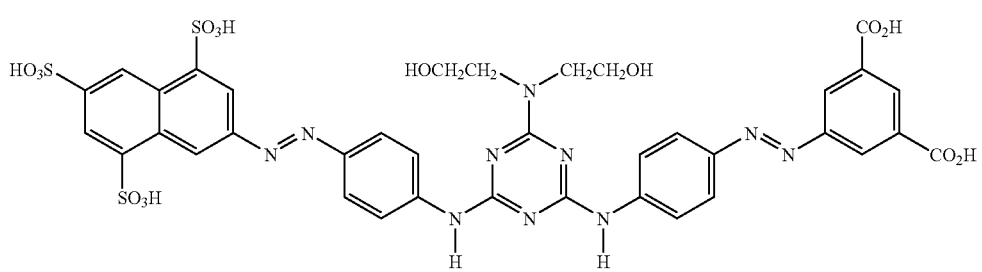

Formula (7)

-continued

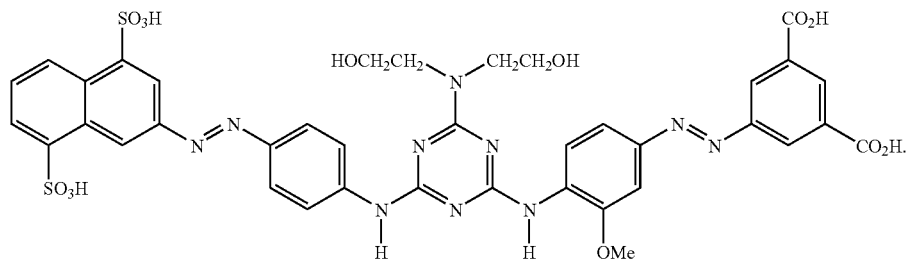

Formula (8)

8. A compound according to claim 5 which is in the form of a salt which is an alkali metal salt, ammonium salt, substituted ammonium salt or a mixed salt thereof.

9. An ink comprising a compound or salt thereof according to claim 5 and a liquid medium.

10. A substrate printed with an ink according to claim 9.

11. An ink jet printer cartridge comprising a chamber and ink, wherein the ink is present in the chamber and the ink is according to claim 9.

* * * * *